G. F. STEEDMAN.
AIR DRIER.
APPLICATION FILED JUNE 18, 1914.
1,153,181.
Patented Sept. 7, 1915.
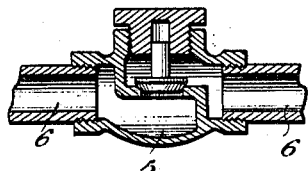
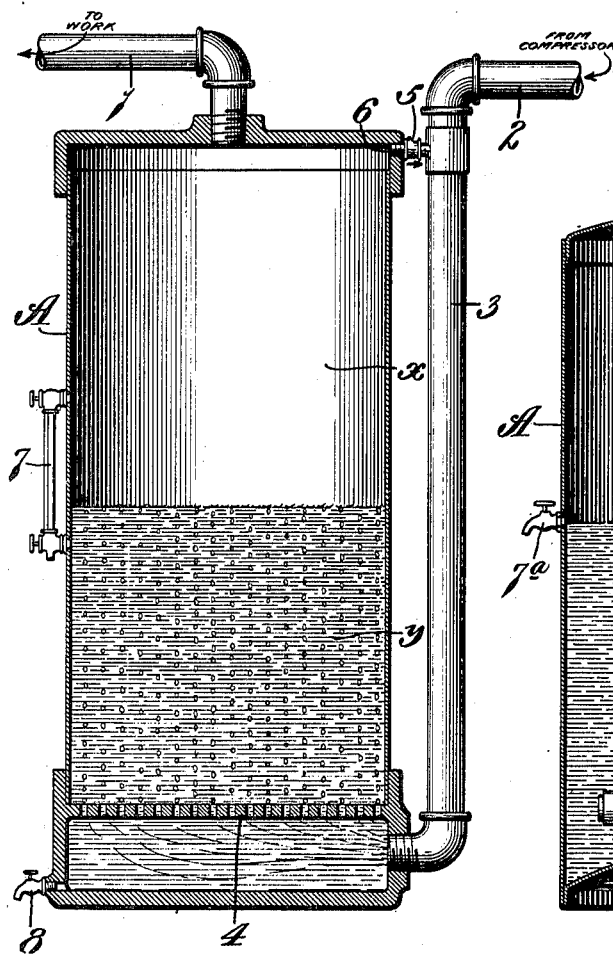
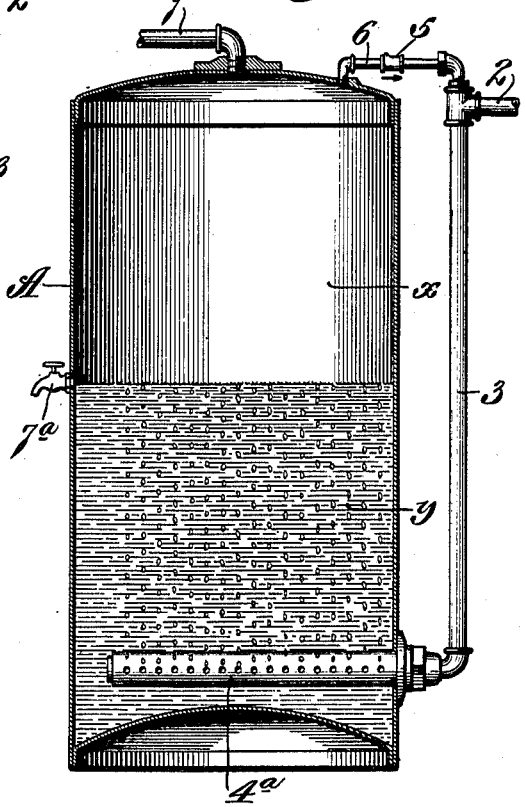
Inventor:
George F. Steedman.
By Bakewell & Church, Attys.

UNITED STATES PATENT OFFICE.

GEORGE F. STEEDMAN, OF ST. LOUIS, MISSOURI, ASSIGNOR TO CURTIS & COMPANY MANUFACTURING COMPANY, OF WELLSTON, MISSOURI, A CORPORATION OF MISSOURI.

AIR-DRIER.

1,153,181.  Specification of Letters Patent.  Patented Sept. 7, 1915.

Application filed June 18, 1914. Serial No. 845,969.

*To all whom it may concern:*

Be it known that I, GEORGE F. STEEDMAN, a citizen of the United States, residing at St. Louis, Missouri, have invented a certain new and useful Improvement in Air-Driers, of which the following is a full, clear and exact description, such as will enable others skilled in the art to which it appertains to make and use the same.

This invention relates to air driers, and has for its main object to provide an efficient device of simple construction for drying air that is under pressure.

Another object is to provide a device for removing moisture and oil from air coming from an air compressor and storing said air without liability of damage to the compressor, in case of leakage of pressure at the compressor when the compressor is shut down. And still another object is to provide a compressed air storage tank that comprises a body of liquid through which the air passes in entering the storage space of the tank, and a check valve arranged between the compressor and the storage space of the tank and opening toward the compressor so as to prevent the liquid in the tank from backing up into the compressor, in case a leak develops at the compressor or in the supply line between the tank and the compressor when the compressor is not in operation.

Other objects and desirable features of my invention will be hereinafter pointed out.

Figure 1 of the drawings is a vertical sectional view of a drier constructed in accordance with my invention. Fig. 2 is a similar view illustrating a slight modification of my invention; and Fig. 3 is a detail sectional view illustrating the check valve arranged between the compressor and the storage tank.

Referring to the drawings which illustrate the preferred form of my invention, A designates a tank or reservoir that is provided at its upper end with an outlet pipe 1, through which the air in the storage space $x$ of the tank escapes. A pipe 2 that leads from a compressor (not shown) communicates with a vertically disposed pipe 3 arranged outside of the tank A and leading to the lower end of the tank. In the lower portion of the tank A is a body of liquid $y$, preferably water, through which the air from the compressor has to travel before it enters the storage space $x$ of the tank.

The air, in passing through the water $y$, is cooled somewhat by the water and the moisture in the air bubbles is attracted to the surrounding water and very effectually removed from the air, as is also any oil in the air. Means is preferably provided for breaking up the air into small streams so as to cause the air to rise through the water $y$ in small bubbles, thus assisting in the rapid cooling of the air and giving a larger area of liquid surface to the bubbles, to which the moisture in the bubbles will be attracted. The means for breaking up the air entering through the pipe 3 may either consist of a perforated diaphragm 4 arranged at the lower end of the tank A above the point where the pipe 3 enters said tank, as shown in Fig. 1, or a perforated pipe $4^a$ can be arranged in the tank A at the point where the pipe 3 enters said tank, as shown in Fig. 2.

The device is so constructed that there is no possibility of the liquid $y$ in the tank A backing up into the compressor, in case a leakage of pressure at the compressor occurs when the compressor is shut down. In the form of my invention shown in Fig. 1 a check valve 5 is arranged in a passageway 6 that establishes communication between the storage space of the tank and the upper end of the pipe 3, said pipe 3 preferably rising to the full height of the tank. The check valve 5 opens toward the compressor and is therefore inoperative so long as the pressure in the tank A is less than the pressure at the compressor. If, however, the conditions are reversed, the air will flow from the storage space $x$ of the tank into the upper end of the pipe 3, thus equalizing the pressure on both sides of the body of liquid $y$ in the tank and preventing the liquid $y$ in the tank from backing up into the compressor. It will thus be seen that the check valve 5 effectually prevents the liquid in the tank A from backing up into the compressor and probably damaging the compressor, in case a leakage of pressure at the compressor occurs when the compressor is not in operation.

In the form of my invention shown in Fig. 2 the passageway 6, in which the check valve 5 is arranged, leads from the top of the tank A to the upper end of the pipe 3, the check valve opening toward the compressor, as indicated by the arrow in said figure.

The tank can be provided with a glass water gage 7, as shown in Fig. 1, for indicating the level of the liquid in the tank, or a cock 7ª can be arranged in the side of the tank so as to control the level of the liquid and also permit the oil which collects on the surface of the liquid to be blown off. In Fig. 1 I have shown a drain cock 8 at the lower end of the tank.

Having thus described my invention, what I claim is:

1. An air drier consisting of a closed container provided adjacent its lower end with an inlet that communicates with the discharge pipe of an air compressor, a body of liquid in said container through which the air from the compressor passes before it enters the air storage space of the container, and means for equalizing the pressure on opposite sides of said body of liquid in case a leakage of pressure at the compressor occurs when the compressor is not in operation.

2. An air drier consisting of a closed container provided adjacent its lower end with an inlet that communicates with the discharge pipe of an air compressor, a body of liquid in said container through which the air from the compressor passes before it enters the air storage space of the container, and a check valve arranged in a passageway between the air storage space of the container and the discharge pipe from the compressor and opening toward the compressor.

3. An air drier consisting of a reservoir partly filled with liquid, means for discharging the air from an air compressor into said liquid so as to cause the air to travel through the liquid in passing into the air storage space above the level of the liquid, means for breaking up the air entering said reservoir into small streams, and means for equalizing the pressure on both sides of the liquid in case a leakage of pressure at the compressor occurs when the compressor is not in operation.

4. An air drier consisting of a reservoir partly filled with liquid, an outlet from said reservoir above the level of said liquid, a discharge pipe from an air compressor leading to the lower end portion of said reservoir and having an upright portion that rises to a point above the level of the liquid in said reservoir, a passageway for establishing communication between the upper portion of said reservoir and the upright portion of said compressor discharge pipe, and a check valve in said passageway that opens toward the compressor.

5. An air drier consisting of a reservoir partly filled with liquid, an outlet from said reservoir above the level of said liquid, a discharge pipe from an air compressor leading to the lower end portion of said reservoir and having an upright portion that rises to a point above the level of the liquid in said reservoir, a passageway for establishing communication between the upper portion of said reservoir and the upright portion of said compressor discharge pipe, a check valve in said passageway that opens toward the compressor, means for breaking up the air entering said reservoir into minute bubbles, and means on said reservoir for determining the level of the liquid therein.

6. An air drier consisting of a reservoir partly filled with liquid, an outlet from said reservoir above the level of said liquid, a discharge pipe from an air compressor leading to the lower end portion of said reservoir and having an upright portion that rises to a point above the level of the liquid in said reservoir, a passageway for establishing communication between the upper portion of said reservoir and the upright portion of said compressor discharge pipe, a check valve in said passageway that opens toward the compressor, a perforated member through which the air entering the reservoir passes, and means for enabling any foreign matter which collects on the surface of the liquid to be removed from said reservoir.

In testimony whereof I hereunto affix my signature in the presence of two witnesses, this 13th day of June, 1914.

GEORGE F. STEEDMAN.

Witnesses:
L. S. BUCKLES,
D. M. BALL.